(12) United States Patent
Baccouche et al.

(10) Patent No.: US 10,106,206 B1
(45) Date of Patent: Oct. 23, 2018

(54) STRUCTURAL STORAGE COMPARTMENT IN A VEHICLE CABIN

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Srinivasan Sundararajan, Ann Arbor, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/692,601

(22) Filed: Aug. 31, 2017

(51) Int. Cl.
*B62D 29/04* (2006.01)
*B62D 21/15* (2006.01)
*B62D 25/04* (2006.01)
*B60R 5/04* (2006.01)
*B60R 7/02* (2006.01)
*B60N 2/36* (2006.01)

(52) U.S. Cl.
CPC ............ *B62D 29/046* (2013.01); *B60R 5/044* (2013.01); *B62D 21/157* (2013.01); *B62D 25/04* (2013.01); *B60N 2/36* (2013.01); *B60R 7/02* (2013.01)

(58) Field of Classification Search
CPC .... B62D 29/046; B62D 21/157; B62D 25/04; B60R 5/044
USPC .................................. 296/37.1, 37.8, 193.02
See application file for complete search history.

(56) References Cited

U.S. PATENT DOCUMENTS

| | | | | |
|---|---|---|---|---|
| 3,391,960 | A * | 7/1968 | Megargle | A47B 23/04 108/44 |
| 4,944,544 | A | 7/1990 | Dick | |
| 5,143,265 | A * | 9/1992 | Schultz | B60N 3/12 224/483 |
| 6,546,598 | B1 | 4/2003 | Nakanou et al. | |
| 6,568,745 | B2 * | 5/2003 | Kosuge | B62D 21/157 296/187.12 |
| 7,090,274 | B1 | 8/2006 | Khan et al. | |
| 7,614,686 | B2 * | 11/2009 | Robertson | B60J 7/04 296/187.12 |
| 2016/0016614 | A1 * | 1/2016 | Conze | B29C 70/345 296/193.12 |

FOREIGN PATENT DOCUMENTS

DE         102012004821 A1    9/2013

\* cited by examiner

*Primary Examiner* — Joseph D. Pape
(74) *Attorney, Agent, or Firm* — Jason Rogers; Brooks Kushman P.C.

(57) ABSTRACT

An autonomous vehicle can include a front seat facing rearward, and a rear seat facing forward. This provides a common foot or leg area between the seats that face each other. The vehicle includes a body that has a pair of opposing B-pillars. A support beam extends through the common leg area, between the front and rear seats, and mounts to the B-pillars. The support beam provides direct structural support to the B-pillars. A luggage compartment is coupled to the support beam and extends between the B-pillars. The luggage compartment has access openings that face forward and rearward, allowing the forward and rearward passengers to store luggage.

17 Claims, 3 Drawing Sheets

STRUCTURAL STORAGE COMPARTMENT IN A VEHICLE CABIN

TECHNICAL FIELD

The present disclosure generally relates to a structural storage compartment within a cabin of an automotive vehicle. More particularly, the structural storage compartment both provides a container for storing items such as luggage and reinforces side pillars of the vehicle's body.

BACKGROUND

Autonomous vehicles are becoming more and more popular in their research and design, performance capabilities, and safety measures. Since the driver in an autonomous vehicle can enjoy the outside scenery more so than if he/she was driving, development has been underway to improve the ability of the occupants to better view the outdoors. Such features include 360 degree panoramic views, mobile roof structures, 360 degree moveable seats including rearward facing seats, and other features.

Additionally, vehicles are constantly being designed and developed to reduce weight and costs while still maintaining or improving safety (e.g., crash) characteristics. To accomplish some of the features such as panoramic views, the frame of the vehicle must be redesigned to allow a fuller view of the outside.

SUMMARY

According to one embodiment, an autonomous vehicle includes a cabin having a front seat facing rearward and a rear seat facing forward with a common leg area between the seats for passenger legs. A vehicle body includes a pair of opposing B-pillars located between the front and rear seats. A support beam extends through the common leg area and mounts directly to the B-pillars. A luggage compartment is mounted above the support beam and extending between the B-pillars.

The support beam may be a single, unitary, aluminum beam. The luggage compartment may connect both B-pillars. The luggage compartment may include a frame made of sheet molding compound. The luggage compartment may include a door that provides access to a cavity sized to house passenger luggage.

In another embodiment, an autonomous vehicle includes an interior cabin bound by a cabin floor and a cabin ceiling. A body structure includes a pair of opposing B-pillars. A cross beam extends across the cabin, is located closer to the cabin floor than the cabin ceiling, and is mounted to the B-pillars. A luggage compartment is sized to receive passenger luggage and is mounted to a surface of the cross beam.

In yet another embodiment, a vehicle includes a cabin including a forward seat, a rearward seat facing the forward seat, and a common floor between the seats. A body includes a pair of opposing pillars. A support beam extends through the cabin between the forward seat and the rearward seat. The support beam is spaced above the common floor and is mounted to the pillars. A storage compartment is mounted to a surface of the support beam.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
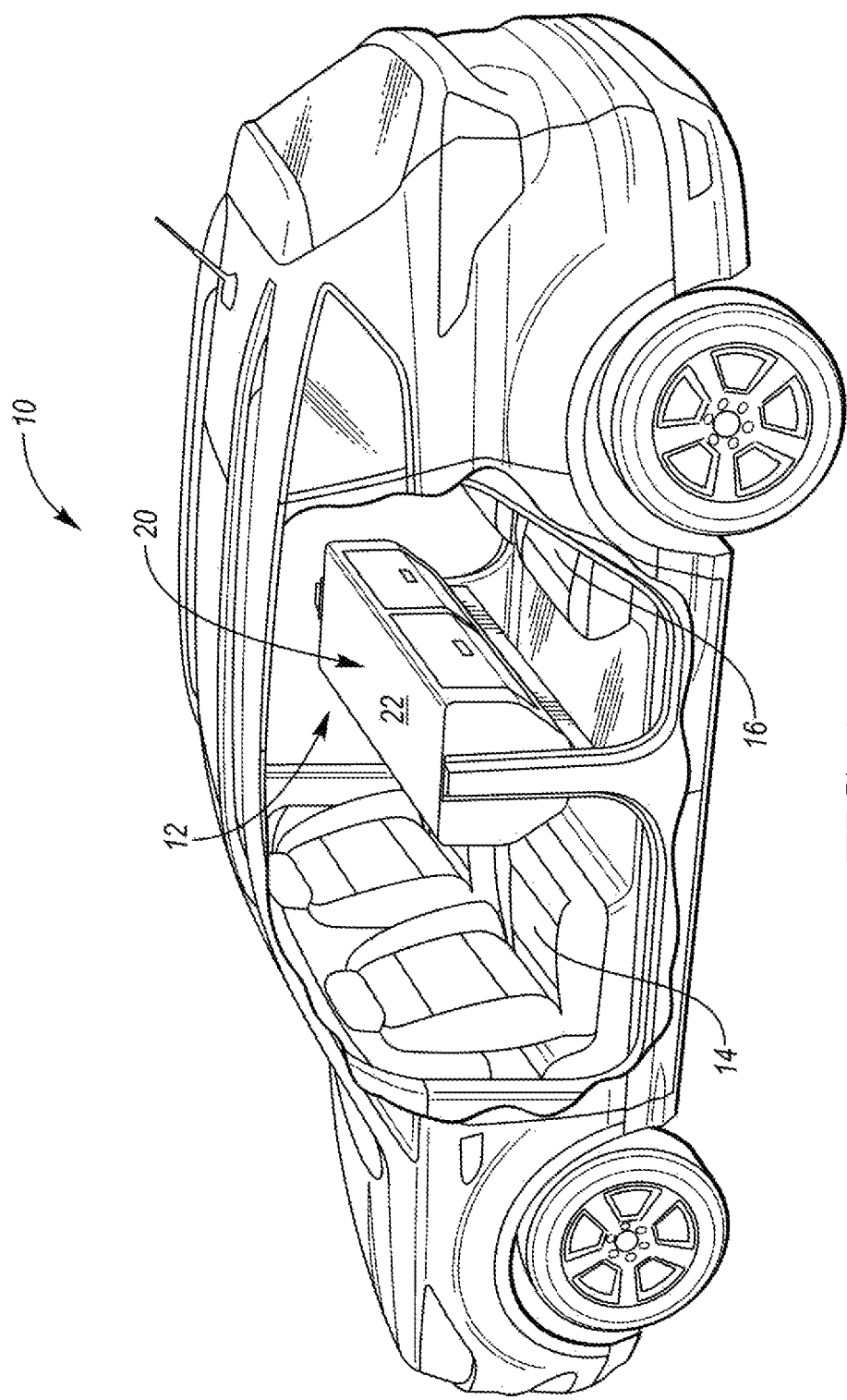
FIG. 1 is a perspective view of a vehicle with a cutaway to illustrate an interior cabin of the vehicle having a structural storage compartment, according to one embodiment.

FIG. 1 shows a vehicle 10 having an interior cabin 12 for occupants or operators to sit. The term "vehicle" refers to a land automotive vehicle such as a car, truck, van, etc. The vehicle may be an autonomous vehicle in which the vehicle can accelerate, brake, steer, etc. with minimal or no direct input from a driver being necessary. Such autonomy is known in the art, and the technology to bring fully autonomous vehicles to the public continues to increase rapidly. Being able to essentially drive automatically, an autonomous vehicle allows a front seat 14 to face rearward while a rear set 16 faces forward. In other words, the front seat 14 and rear set 16 can face one another. This configuration of seating opens up the possibilities for redesigning of vehicle cabins to properly accommodate the passengers. A common leg area can be provided between the seats on a cabin floor, where both front and rear passengers can rest their legs and feet.

As such, the present disclosure is directed toward a structural storage compartment 20 (also referred to as a luggage compartment) located in the vehicle 10. The storage compartment 20 can be located between the front seat 14 and the rear seat 16. As will be described below, the storage compartment 20 includes one or more interior chambers or compartments sized for storing luggage, etc. This is particularly suitable if the vehicle 10 is a rental or shared-ride vehicle for passengers that may be traveling or temporarily in town. A top surface 22 may be generally planar or flat to provide a table top surface between the front and rear seats. This provides a flat working surface for passengers that desire to perform work or activities such as writing, typing, etc. while the vehicle is driving.

Figure 2:
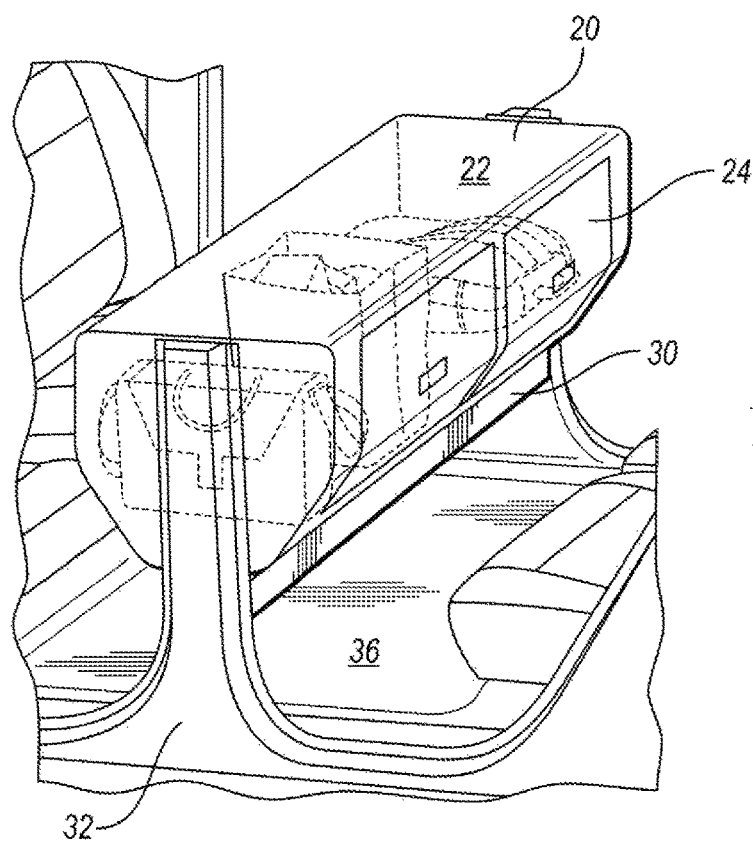
FIG. 2 is a perspective view of the structural storage compartment with items being stored there, according to one embodiment.

FIG. 2 shows a perspective view of the storage compartment 20. The storage compartment 20 can be provided with one or more doors 24 to provide the occupants with access to the interior of the storage compartment 20. In the illustrated embodiment, two doors are provided on each front and rear side of the storage compartment. The interior of the storage compartment 20 can be divided accordingly, with one interior section associated with and accessible from one of the front-facing doors and rear-facing doors. In another embodiment, the interior of the storage compartment 20 can be a single open cavity with no divisions or separate compartments within.

As shown in FIG. 2, the interior of the storage compartment 20 is sized to store luggage, groceries, baggage, and the like. In one embodiment, the interior of the storage compartment 20 is roughly 24 inches tall and 24 inches deep, and extends from side-to-side between the entire cabin of the vehicle.

Figure 3:
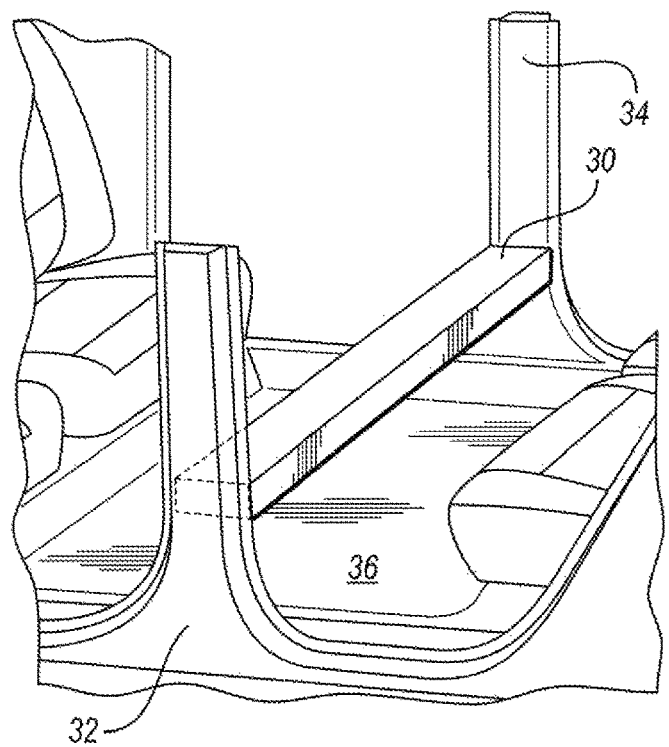
FIG. 3 is a perspective view of a structural support for supporting the storage compartment, in which the structural support is mounted or otherwise attached to side pillars of a structural body of the vehicle.

The storage compartment 20 is supported by a structural support 30, shown in FIG. 3 with the storage compartment removed for illustrative purposes. In one embodiment, the structural support 30 is a single extruded aluminum beam, made of 6000-series aluminum. The structural support 30 may be a two-cell aluminum member having side-by-side hollow cells. The structural support extends from side to side of the vehicle, mounting or otherwise attaching to the vehicle frame 32. More particularly, the structural support 30 can attach or mount to side pillars (e.g., B-pillars) 34 of the vehicle frame 32. Methods of attaching or mounting the structural support 30 to the side pillars 34 include welding, brazing, fastening (e.g., bolting), soldering, and the like. Such methods provide a direct attachment or direct mounting of the structural support 30 to the side pillars 34. Alternatively, the structural support 30 can be an integral extension of the frame 32.

In the illustrated embodiment, the side pillars 34 are partial B-pillars that extend only partially toward a top of the vehicle. In other words, the side pillars 34 may not extend entirely to the roof or other overlying frame above the vehicle's cabin. Such partial B-pillars may be particularly useful in autonomous vehicles, like the illustrated vehicle, in which the front and rear seats face each other. Removing a part of the B-pillar improves the view for the passengers, enabling glass windows to extend in the space vertically between the partial B-pillar and the roof structure. The structural support 30 improves the rigidity and impact-resistant forces of the partial B-pillars, improving the ability of the vehicle to absorb and resist forces potentially resulting from a side impact.

In one embodiment, the structural storage compartment 20 is made of sheet molding composite or sheet molding compound (SMC). The SMC is bonded or otherwise attached to an upper surface of the structural support 30. The structural storage compartment 20 may be supported by the structural support 30 alone, and may also attach to the side pillars 34. In another embodiment, the storage compartment 20 is only supported by the structural support 30 and is not directly attached to the side pillars.

As shown in FIGS. 2 and 3, the structural support 30 may be elevated from a floor 36 of the vehicle cabin. This provides room for passengers to rest their feet beneath the structural support 30. To also allow for leg room, the storage compartment 20 may be tapered to narrow towards the underlying structural support 30, as shown in FIG. 2. The interior of the storage compartment 20 may correspondingly be tapered at the bottom. Alternatively, a flat floor may be located in the storage compartment at an elevated distance away from the underlying structural support such that the tapering of the interior of the storage compartment 20 is reduced or eliminated. This assures that larger items fitted within the storage compartment have a flat surface to lay on that extends the entire depth of the interior of the compartment, so that the items do not fall within or remain unsupported by a tapered interior.

As mentioned, the storage compartment 20 may be provided with one or more doors 24. These doors, when closed, enclose the interior of the storage compartment such that the storage compartment is a completely enclosed structure. The doors 24 may include or be made of a transparent material (e.g., glass, plastic, plexiglass, etc.) to allow the occupants to monitor and view their stored goods at all time. Likewise, the upper surface 22 may include or be made of the same transparent material for similar benefits.

Figure 4:
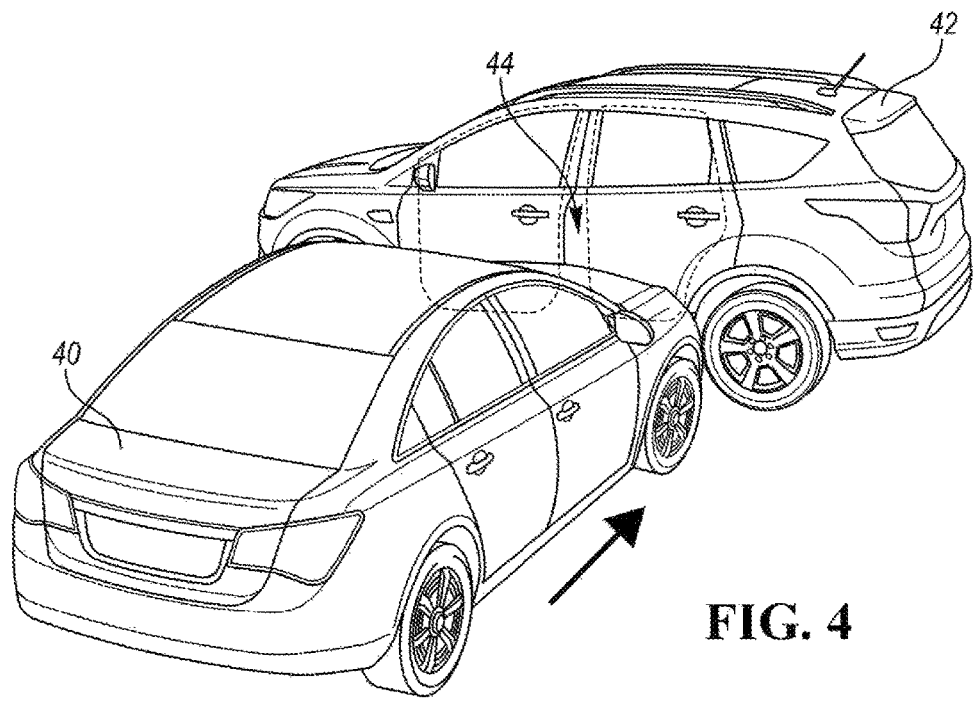
FIG. 4 is a perspective view of a side impact event in which the side of one vehicle is being struck by a front of another vehicle.

Referring to FIG. 4, an example of a side impact event is shown in which a first vehicle 40 is striking a second vehicle 42. The second vehicle is not equipped with the structural storage compartment 20 or underlying structural support 30. The B-pillar 44 is directly impacted by the first vehicle 40, and absorbs much of the impact while directing the impact to different portions of the vehicle's frame.

Figure 5:
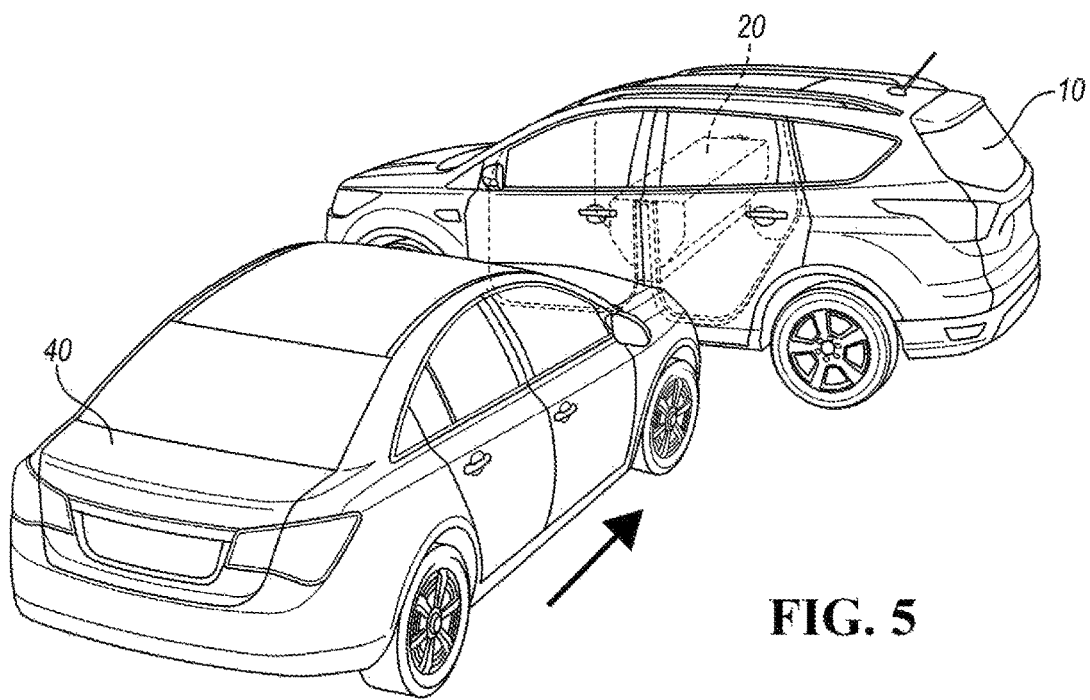
FIG. 5 is a perspective view of another side impact event in which the vehicle being struck from its side is equipped with the structural storage compartment and an associated structural support thereunder which supports the side pillars of the body to resist the side impact forces.

Referring to FIG. 5, an example of a similar side impact event is shown, this time in which the first vehicle 40 impacts the vehicle 10 described above. The vehicle 10, being equipped with the structural storage compartment 20 and underlying structural support 30, is able to better handle a direct impact to the B-pillar. In this embodiment, the underlying structural support 30 (and, optionally the structural storage compartment 20 itself) directly mount or couple to the B-pillars, extending therebetween. This serves as an impact-resisting structure for reducing damage done to the vehicle 10 in the event of a direct side impact to the B-pillar.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. An autonomous vehicle comprising:
   a cabin having a front seat facing rearward and a rear seat facing forward with a common leg area between the seats for passenger legs;

a vehicle body including a pair of opposing B-pillars;
a support beam extending through the common leg area and directly mounted to the B-pillars; and
a luggage compartment mounted above the support beam and extending between the B-pillars;
wherein the luggage compartment includes a first door facing the front seat that provides a front passenger with access to a first cavity sized to house luggage, and a second door facing the rear seat that provides a rear passenger with access to the first cavity or a second cavity sized to house luggage.

2. The autonomous vehicle of claim 1, wherein the support beam is a single, unitary, aluminum beam.

3. The autonomous vehicle of claim 1, wherein the luggage compartment includes a frame made of sheet molding compound.

4. The autonomous vehicle of claim 1, wherein the luggage compartment includes a door that provides access to a cavity sized to house passenger luggage.

5. An automotive vehicle comprising:
an interior cabin bound by a cabin floor and a cabin ceiling;
a body structure including a pair of opposing B-pillars;
a cross beam extending across the cabin, located closer to the cabin floor than the cabin ceiling, and mounted to the B-pillars; and
a luggage compartment sized to receive passenger luggage, mounted to a surface of the cross beam, and having a planar upper surface providing a table top.

6. The vehicle of claim 5, wherein the luggage compartment is supported directly beneath by an upper surface of the cross beam.

7. The vehicle of claim 5, wherein the luggage compartment mounts directly to the B-pillars and extends entirely across a distance between the B-pillars within the cabin.

8. The vehicle of claim 5, further comprising a front seat facing the luggage compartment and a rear seat facing the luggage compartment.

9. The vehicle of claim 8, wherein the luggage compartment includes a frame and first and second doors coupled to the frame, the first door facing the front seat and the second door facing the rear seat.

10. The vehicle of claim 5, wherein the luggage compartment includes a frame made of sheet molding compound.

11. The vehicle of claim 5, wherein the cross beam is a single unitary aluminum beam.

12. The vehicle of claim 5, wherein the cross beam is spaced above the cabin floor.

13. The vehicle of claim 5, wherein a gap exists between the cross beam and the cabin floor, wherein the gap is sized to enable passengers to extend their feet between the cross beam and the cabin floor.

14. A vehicle comprising:
a cabin including a forward seat, a rearward seat facing the forward seat, and a common floor between the seats;
a body including a pair of opposing pillars;
a support beam extending through the cabin between the forward and rearward seats, spaced above the common floor, and mounted to the pillars; and
a storage compartment having access openings facing forward and rearward, and mounted to a surface of the support beam.

15. The vehicle of claim 14, wherein the support beam is a unitary extruded aluminum beam.

16. The vehicle of claim 14, wherein the storage compartment has a planar upper surface providing a table top between the forward seat and rearward seat.

17. The vehicle of claim 14, wherein the body includes roof rails, and the pillars are partial B-pillars that do not connect to the roof rails.

* * * * *